Dec. 10, 1929. S. OLSON Re. 17,517
AUTOMATIC TRANSFER MECHANISM FOR CONVEYERS
Original Filed Nov. 26, 1920 2 Sheets-Sheet 1
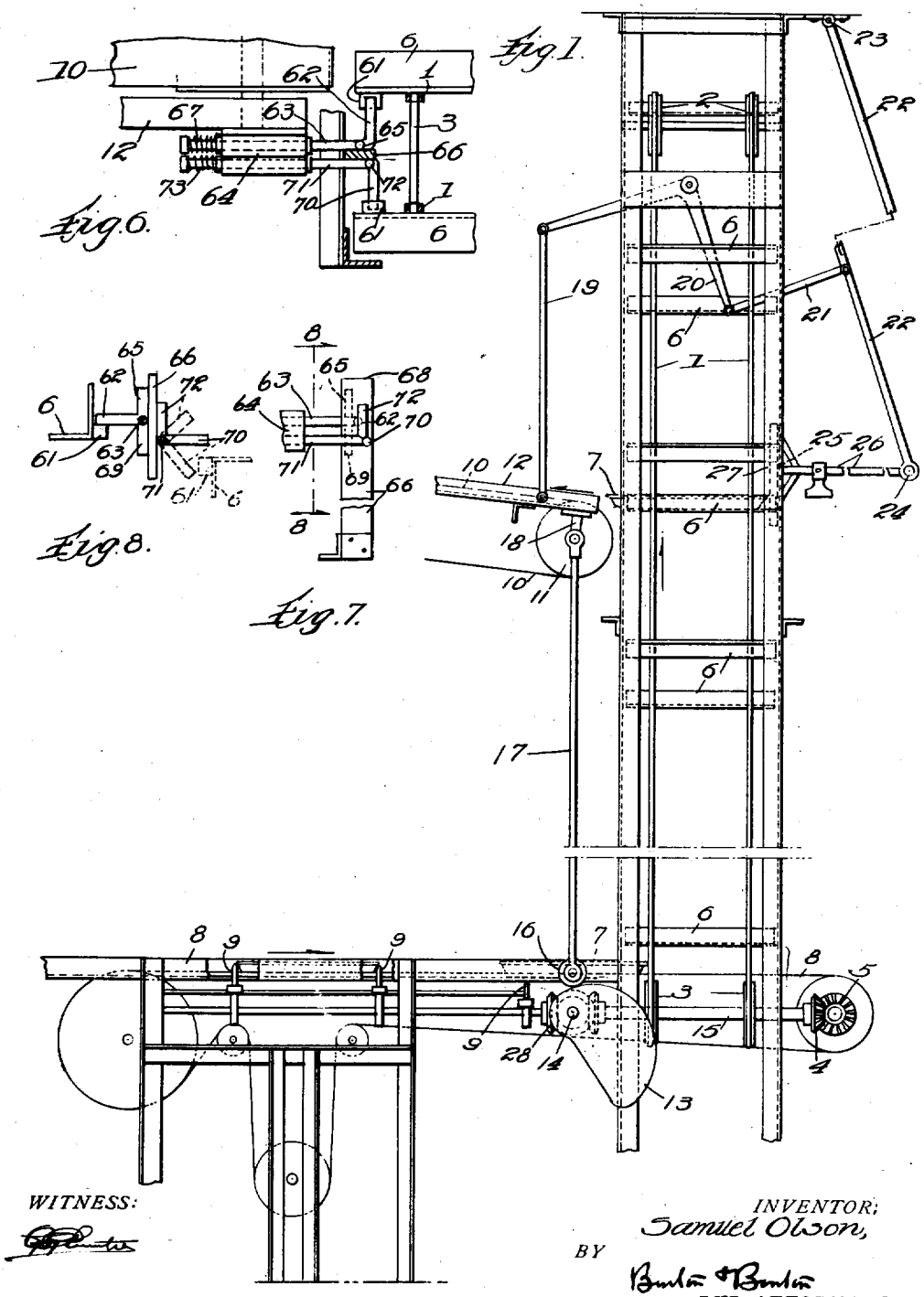
WITNESS:
INVENTOR:
Samuel Olson,
BY
Burton & Burton
HIS ATTORNEYS.

Dec. 10, 1929. S. OLSON Re. 17,517
AUTOMATIC TRANSFER MECHANISM FOR CONVEYERS
Original Filed Nov. 26, 1920 2 Sheets-Sheet 2
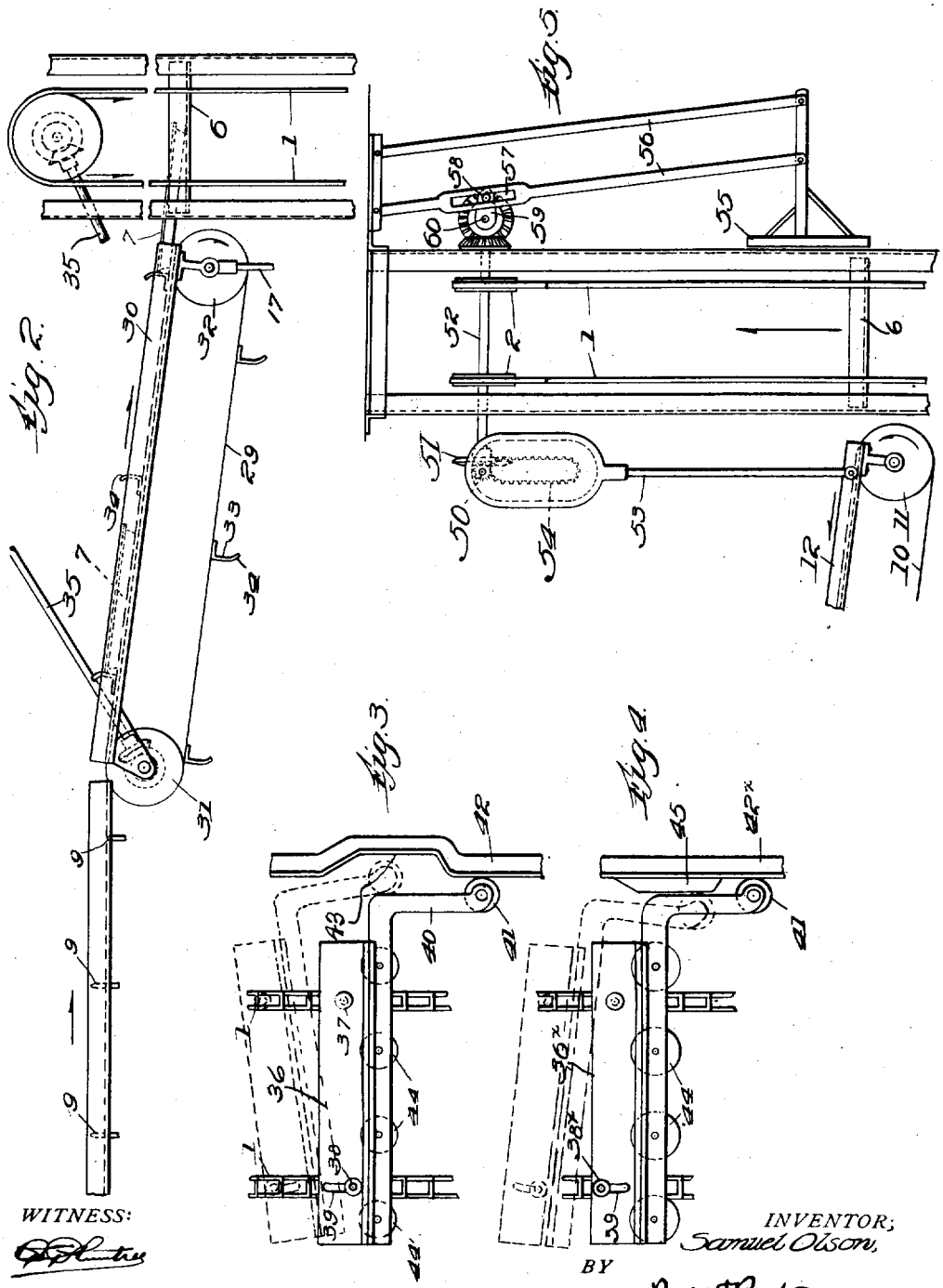
WITNESS:
INVENTOR;
Samuel Olson,
BY
Burton & Burton
HIS ATTORNEYS.

Reissued Dec. 10, 1929

Re. 17,517

UNITED STATES PATENT OFFICE

SAMUEL OLSON, OF OAK PARK, ILLINOIS, ASSIGNOR TO SAMUEL OLSON & COMPANY, OF CHICAGO, ILLINOIS, A CORPORATION OF ILLINOIS

AUTOMATIC TRANSFER MECHANISM FOR CONVEYERS

Original No. 1,636,429, dated July 19, 1927, Serial No. 426,343, filed November 26, 1920. Application for reissue filed May 23, 1929. Serial No. 365,586.

The purpose of this invention is to provide means for the interchange of loads between adjacent and transversely moving conveyers, as for example, between a horizontal conveyer and a vertical conveyer or elevator; and it is especially designed to operate automatically while both conveyers are moving continuously in their respective directions. It consists of the features and elements of construction and their combination hereinafter described and shown in the drawings as indicated by the claims.

In the drawings:

Figure 1 is a somewhat diagrammatic elevation of a vertical conveyer and an approximately horizontal cenveyer arranged to receive loads therefrom, the view also including a horizontal conveyer with a timed feeding mechanism by which the loads are initially supplied to the vertical conveyer.

Figure 2 is a fragmental side elevation of a part of the same vertical conveyer and another horizontal conveyer associated therewith designed to transfer its loads thereto.

Figure 3 is a fragmental side elevation of a modified load supporting device for a vertical conveyer and means controlling it to effect discharge or transfer of its load.

Figure 4 is a view similar to Fig. 3 showing another modified construction for the same purpose.

Figure 5 shows a part of a vertical conveyer and a part of a horizontal conveyer with modified means for controlling the transfer of loads from the former to the latter.

Figure 6 is a fragmental plan view of a further modification of the means for maintaining registration of two conveyers during the transfer of a load.

Figure 7 is a side elevation of certain parts shown in Figure 6.

Figure 8 is a detail section, taken as indicated at line 8—8 on Figure 7.

As shown in Figure 1 the vertical conveyer or elevator may be understood to consist of two pairs of endless chains or belts, 1, of which only one pair appears in the drawing, and which are carried on head wheels, 2, and tail sprockets, 3, the latter being geared as by the bevel gears, 4 and 5, to any suitable source of power. The chains or belts, 1, are fitted with flights or ledges, 6, said flights, 6, of each pair of chains, 1, being disposed to register horizontally with those of the other pair for supporting a load such as a tray of the form shown at 7. These trays, 7, may be loaded onto the upwardly travelling flights, 6, of the elevator either by hand or automatically from a horizontal belt cenveyer, 8, provided with timing stops, 9, which may be automatically actuated by mechanism more fully described in my Patent No. 1,469,329 granted October 2, 1923. For the present purpose it is sufficient to say that the stops, 9, will so control the advance of trays, 7, toward the elevator that such trays will be advanced one at a time at suitable intervals for delivery onto the flights, 6. It may be noted that the belt, 8, travels between the two pairs of chains, 1, and their flights so that the flights merely lift the tray, 7, from the belt, 8, as they rise past it.

The next problem is to remove the trays or other form of loads from the flights, 6, when they have been carried to the desired elevation and usually it is required that such loads be transferred to some point horizontally distant from the elevator. For this purpose the present invention provides an approximately horizontal conveyer belt, 10, whose tail pulley, 11, is supported by a frame, 12, closely adjacent the path of the elevator flights, 6. The opposite end of the frame, 12, which does not appear in the drawing may be understood as pivoted to a fixed support but the end adjacent the elevator is vertically movable through a limited range in order that it may be maintained in accurate registration with each set of flights, 6, for a sufficient distance to give time for the transfer of a load from the flights to the conveyer belt, 10. Figure 1 shows means for thus moving the end of the frame, 12, with the tail pulley, 11, vertically, said means consisting of a cam, 13, on a shaft, 14, which is driven through suitable gearing from the tail shaft, 15, of the elevator so that the cam operates in positive relation to the elevator and its flights, 6. A follower roller, 16, on the cam is carried in a push rod, 17, connected at its upper end to the bracket 18, in which the shaft of the pulley, 11, is journaled on the frame, 12. The cam, 13, is so shaped as to cause the frame, 12, and tail pulley, 11, to rise from its lower to its upper limit at exactly the speed of travel of the flights, 6, and the cam is so set upon its shaft, 14, that this upward movement will begin when a pair of said flights, 6, come into registration with the upper and load receiving ply of the belt, 10. The return portion of the cam is shaped to allow the frame, 12, to descend more rapidly so as to arrive at its lower limit in time for registration with the next pair of upwardly moving flights, 6.

Connected to the frame, 12, by a link, 19, bell crank, 20, and the second link, 21, is a lever arm, 22, fulcrumed at its upper end, 23, on any convenient fixed member and engaged at its lower end, 24, with a pusher, 25, having a guide stem, 26, mounted for horizontal reciprocation at the side of the elevator opposite that at which the conveyer belt, 10, is located. The pusher, 25, has a vertically extending face, 27, dimensioned to remain in contact with the edge of the tray during the interval of upward travel through which the belt, 10, remains in registration with the tray or load supporting flights, 6. The upward movement of the frame, 12, caused by the cam, 13, causes the pusher, 25, to travel horizontally across the path of the ascending load and thus slide the load from its supporting flights, 6, on to the belt, 10. The principal reason for the quick return movement provided for in the shape of the cam, 13, is to insure return of the pusher, 25, to its initial position out of the path of the elevator load so that it will not obstruct or collide with the next approaching load or tray. By virtue of the circular portion, 28, of the cam, 13, the pusher, 25, and the conveyer frame, 12, will remain stationary for a short interval to allow the load on the tray to move past the lower edge of the pusher face, 27, whereupon the cam, 13, will cause the frame, 12, with its belt, 10, to rise in registration with the flights, 6, while the pusher, 25, moves horizontally to transfer the tray to the belt, 10 by which it will be conveyed to the desired destination.

Figure 5 shows a modification of the linkage for the same purpose as that shown in Figure 1. Instead of the cam there is provided a pinion, 50, driven through bevel gearing, 51, from the head shaft, 52, and connected with the frame, 12, of the horizontal conveyer by a link, 53, and an elliptical gear or endless rack, 54, which is caused to reciprocate vertically as the pinion, 50, revolves. The pusher, 55, is suspended on parallel links, 56, one of which has a slot, 57, engaging a crank pin, 58, on a crank arm, 59, of shaft, 60, which is also driven by bevel gearing from the head shaft, 52. The links, 56, being fulcrumed above the crank shaft, 60, the pusher, 55, is retracted more rapidly than it is advanced across the path of the upwardly travelling load.

When the elevator or vertical conveyer is travelling downward instead of upward the problem of transferring the load to it from a horizontal conveyer is solved as shown in Figure 2 in which the flights of the elevator are represented as, 6, carried on chains, 1, as in Figure 1, while the horizontal conveyer belt, 29, is supported by a frame, 30, with head pulley, 31, and tail pulley, 32, at its opposite ends respectively. The frame may be pivotally carried at the axis of the pulley, 31, and its free end adjacent the tail pulley, 32, may be controlled through a push rod, 17, and cam mechanism substantially similar to that shown in Figure 1. It is not important, however, that the cam in this instance be shaped to secure a quick return movement of the frame, 30, since instead of providing a pusher for transferring the load it is sufficient to furnish the belt, 29, with flights, 33, which serve to positively deliver a tray such as that shown at 7 during the interval through which the upper ply of the belt, 29, is kept in registration with a pair of flights, 6, of the elevator. Preferably the flights, 33, should be curved back at their upper edges, 34, so as to slide smoothly out of contact with the edge of the tray, 7, or other load as they pass around the tail pulley, 32, and push the tray to its final position on the flights, 6.

It should be understood that the conveyer belt, 29, must be operated in timed relation to the elevator, 6, so that its flights, 33, will arrive adjacent the elevator at the proper instant, and this may be accomplished by driving the belt, 29, through a shaft, 35, which may be understood to be geared to the head shaft of the elevator itself. To insure delivery of the trays, 7, or other loads to the belt, 29, at proper intervals for engagement with the flights, 33, thereon a timing mechanism comprising stops, 9, and otherwise similar to that shown in Figure 1 may be supplied in connection with the horizontal conveyer.

In some cases, particularly where the loads are of fairly uniform weight and dimensions, it may not be necessary to employ a positive pusher such as that shown in Figure 1 but the force of gravity may be utilized for discharging the loads from the flights of the elevator. In such case the flights may be made as shown at 36 in Figure 3 with pivotal connection, 37, to one of the chains, 1, and with a pin, 38, and slot, 39, for connection with the other chain, 1. A guide arm, 40, secured to each flight carries a roller, 41, in contact with the guide rail, 42, extending vertically along the path of the chains, 1, and normally maintaining the flights, 26, in horizontal position. At the desired position for discharge of the load, however, the rail, 42, may be formed with a depression, 43, into which the roller, 41, will drop as the chains, 1, ascend, thus permitting tilting of the flights, 36, to the position shown in dotted lines in Figure 3. If desired the flights may be provided with rollers, 44, to insure prompt discharge of the load by gravity when the flights, 36, are tilted.

Figure 4 shows a slight modification in which the rail 42ˣ, is provided with an upraised portion, 45, instead of a depression which results in tilting the flights, 36ˣ, in opposite direction from that shown in Figure 3. The pin, 38ˣ, is therefore located normally at the upper end of the slot, 39, instead of at the lower end as shown in Figure 3.

Figures 6, 7 and 8, show relatively simple means whereby the travel of the elevator itself will lift the horizontal conveyer, 10, during the transfer of a load. Each of the flights, 6, is provided with a lug or projection, 61, which encounters the bent arm, 62, of a rocker shaft, 63, rotatively mounted in a bearing, 64, on the end of the frame, 12, as shown in Figure 6. An arm, 65, projecting from the rocker shaft, 63, at right angles to the arm, 61, travels adjacent a vertically extending guide rail, 66, for the vertical distance representing the transfer interval, and thus prevents rotation of the rocker shaft, 63, in its bearing, so as to hold the arm, 62, rigidly projecting for engagement with the lug, 61, and constituting a rigid extension of the frame, 12, by which it is lifted as the flight, 6, rises. As the rocker shaft, 63, reaches the upper end, 68, of the guide rail, 66, its rotation is no longer prevented, and the arm, 62, will swing yieldingly upward under pressure of the lug, 61, permitting the latter to pass it. The spring, 67, will then return the arm, 62, to its horizontally projecting position, as the frame, 12, returns by gravity, the downwardly projecting arm, 69, on the rocker shaft, 63, limiting its rotation by encounter with the rail, 66, as indicated in Figure 8. The parts are then in readiness for the next approaching flight, 6.

To ease the return movement of the frame, 12, the arm, 70, of a second rocker shaft, 71, may be so placed on the frame, 12, as to encounter a lug, 61, of one of the flights, 6, at the descending ply of the chain 1, the arm, 70, being temporarily returned in its horizontal position by engagement with a second arm, 72, with the outer face of the guide rail, 66. At the lower limit of movement of the frame, 12, the lug, 61, will simply travel on downwardly while the frame, 12, is arrested by encounter of the rocker shaft, 71, with any convenient stop, such as a cross member of the elevator structure. However, to permit the passage of the next flight, 6, and its lug, 61, during the upward travel of the frame, 12, the arm, 70, is permitted to yield downwardly by rotation of its shaft, 71, in its supporting journal, and is retracted to normal position by a spring, 73, on said shaft.

I claim:

1. The combination of a vertically traveling conveyer with load supporting means disposed at intervals thereon, a transversely traveling conveyer adjacent thereto and arranged for continuously advancing its load and means for moving said transverse conveyer for a limited distance in substantially vertical direction in such a manner as to maintain its registration with the load supporting means of the vertical conveyer during transfer of the load from one conveyer to the other.

2. In combination with a vertically traveling conveyer and a transversely traveling conveyer adjacent thereto and arranged for continuously advancing its load, means for moving the transverse conveyer for a limited distance in vertical direction to maintain registration thereof with load supporting means of the vertical conveyer and means for positively pushing a load from one conveyer to the other during such registration.

3. In the combination defined in claim 2, said pushing means being mounted for discharging a load from the vertical conveyer to the transverse conveyer.

4. In the combination defined in claim 2, said pushing means being mounted for discharging a load from the vertical conveyer to the transverse conveyer with actuating means for said pusher driven in timed relation to the vertical conveyer.

5. In the combination defined in claim 2, said pushing means being mounted to travel across the path of loads on the vertical conveyer in discharging loads therefrom and actuating means therefor driven in timed relation to the load supporting means of the vertical conveyer and including a quick return movement for withdrawing said pusher from said path more rapidly than it advances across it.

6. The combination of a vertically traveling conveyer with load supporting means disposed at intervals thereon, a transversely traveling conveyer adjacent thereto, means for moving the transverse conveyer through a limited vertical distance to maintain its registration with the load supporting means of the other conveyer during transfer of a load from one to the other, and means for effecting such transfer comprising a pusher mounted to reciprocate across the path of loads on the vertical conveyer and vertically extending throughout said limited vertical distance of registration of the two conveyers for maintaining contact with a load while discharging it from the vertical to the transverse conveyer.

7. In the combination defined in claim 6, means for actuating said pusher including quick return movement for withdrawing it from the path of vertically traveling loads more rapidly than it advances in discharging one of them.

8. In combination with a vertically traveling conveyer with load supporting means disposed at intervals thereon and a transversely traveling conveyer adjacent thereto, means for moving the transverse conveyer for a limited distance vertically to maintain its registration with the load supporting means of the vertical conveyer and means for effecting discharge of the load from the latter during such registration of the two conveyers.

9. The combination of a vertically traveling conveyer with load supporting means disposed at intervals thereon, a transversely traveling conveyer adjacent thereto and arranged for continuously advancing its load, and means for moving said transverse conveyer for a limited distance in substantially vertical direction at a rate to maintain registration of the surface from which the load is discharged with the surface which is to receive the load, during transfer of the load from one conveyer to the other.

10. In the combination defined in claim 9, the end of the transverse conveyer remote from the vertical conveyer being designed to provide pivotal support for the same throughout the entire range of raising and lowering of the end thereof adjacent said vertical conveyer.

11. In combination with a vertically traveling conveyer and a transversely traveling conveyer adjacent thereto and arranged for continuously advancing its load, means for moving the transverse conveyer for a limited distance in a vertical direction at a rate to maintain registration of the surface from which the load is discharged with the surface which is to receive the load, during transfer of the load from one conveyer to the other and means for positively pushing a load from one conveyer to the other during such related movement of the two conveyers.

SAMUEL OLSON.